Figure 1:
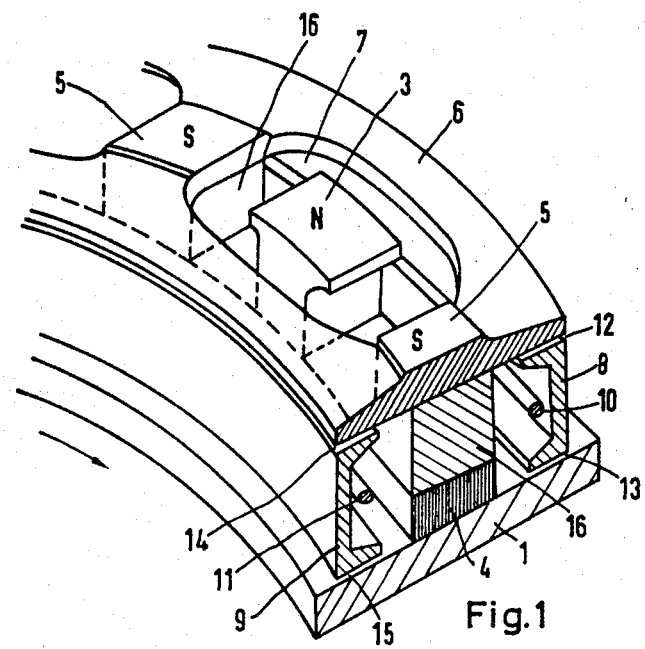

United States Patent Office 3,413,502
Patented Nov. 26, 1968

3,413,502
ROTOR STRUCTURE OF ALTERNATING
POLARITY SYNCHRONOUS MACHINE
Erich Schwab, Nuremberg-Eibach, Germany, assignor to Siemens Aktiengesellschaft, a corporation of Germany
Filed Mar. 25, 1966, Ser. No. 537,543
Claims priority, application Germany, Mar. 27, 1965,
S 96,235
9 Claims. (Cl. 310—181)

The present invention relates to an alternating polarity synchronous machine. More particularly, the invention relates to the rotor structure of an alternating polarity synchronous machine.

In a synchronous machine of the type of the present invention, a rotor shaft of magnetizable material supports uniformly positioned poles of magnetizable material of one polarity. A hollow cylinder at the periphery of the housing of the machine supports the poles of the opposite polarity. The hollow cylinder has window-like openings formed therethrough in correspondence with the poles of the rotor. The hollow cylinder is of magnetizable material. The machine includes stationary annular excitation coils, but has no brushes or slip rings. A pair of annular, disctype stationary magnetic yokes are positioned with the rotor poles between them, but are spaced from said poles and from each other. The magnetic yokes are spaced from the rotor shaft by air gaps and are spaced from the hollow cylinder by air gaps and support the annular excitation coils. Excitation or starting equipment such, as for example, auxiliary starting machinery, may be permanently mounted with the synchronous machine in order to excite the annular excitation coils.

In a machine having a coil free rotor with two rotor portions having axially extending projections extending in opposite directions in interlaced relation with each other, a permanent annular magnet, positioned between the two rotor portions, may be utilized as the excitation or starting equipment. One of the two rotor portions is provided with a controllable magnetic shunt path.

The principal object of the present invention is to provide a new and improved rotor structure of an alternating polarity synchronous machine. When the present invention is utilized in a synchronous machine, the reluctance or resistance of the magnetic path to the flow of magnetic lines of force through it is reduced, the weight of the machine is reduced and the excitation efficiency is enhanced.

In accordance with the present invention, a synchronous machine has a rotor shaft having an axis and a rotor structure. The rotor structure comprises an inner member of substantially hollow cylindrical configuration coaxially positoned around the rotor shaft. A plurality of spaced poles of one polarity are uniformly positioned at equiangular distances from each other on the inner member and extend radially equidistantly from the inner member. A plurality of perment magnets of the other polarity are supported by the inner member in alternate relation with the poles with one of the permanent magnets positioned between each adjacent pair of the poles and extending radially. An outer member of substantially hollow cylindrical configuration is spaced from and coaxially positioned around the inner member and supports the outer ends of the permanent magnets. The outer member has a plurality of equiangularly extending and equiangularly spaced window-like openings formed therethrough and is positioned in a manner whereby each of the poles of the inner member extends into a corresponding one of the openings of the outer member. The poles and the permanent magnets are spaced from each other and the inner member. The poles, the inner member and the outer member each comprise magnetizable material. Each of the poles extends the same radial distance. A rim of substantially hollow cylindrical configuration comprising magnetizable material is coaxially positioned around the rotor shaft within the inner member. A pair of stationary magnetic yokes of annular disc-like configuration are positioned in spaced relation from each other in axial direction with the poles and the permanent magnets between them, each of the magnetic yokes being positioned between and spaced from the rim and the outer member. Each of the magnetic yokes is of substantially U-shaped configuration, with each positioned on its side and opening toward the other. A first annular excitation coil is positioned in proximity with one of the yokes in the area enclosed by the one of the yokes and a second annular excitation coil, spaced from the first, is positioned in proximately with the other of the yokes in the area enclosed by the other of the yokes. A plurality of heads is provided, each affixed to the outer end of a corresponding one of the permanent magnets, the outer ends of the poles being cocylindrically positioned with the heads of the permanent magnets.

Figure 2:
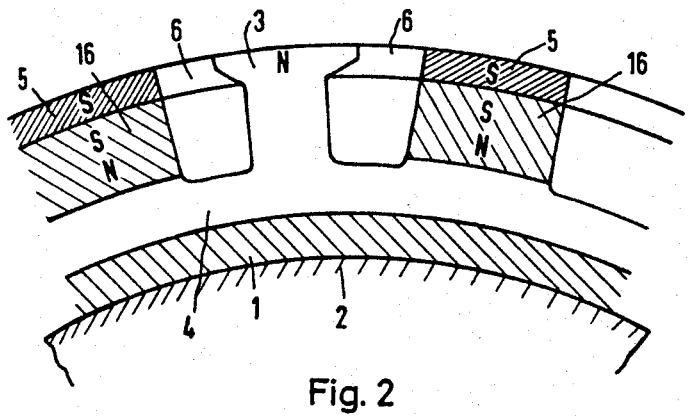

In order that the present invention may be readily carried into effect, it will now be described with reference to the accompanying drawing, wherein:

FIG. 1 is a perspective view, partly in section, of a part of an embodiment of a rotor structure of the present invention; and FIG. 2 is a side view, partly in section, of the embodiment of FIG. 1.

A hub or rim 1 of magnetizable material is coaxially positioned on the shaft 2 of the synchronous machine of the present invention. The rim 1 is of hollow cylindrical configuration and an inner member 4 of substantially hollow cylindrical configuration is coaxially positioned on said rim. The inner member 4 is of magnetizable material and comprises a plurality of radially extending North poles 3 projecting from its base portion of cylindrical configuration. The North poles 3 are uniformly positioned in spaced relation at equiangular peripheral distance from each other and are of uniform radial and other dimensions.

In accordance with the present invention, a plurality of permanent magnets 16 are supported by the inner member 4 in alternate relation with the North poles 3 so that one of the permanent magnets 16 is positioned between each adjacent pair of North poles 3 with the poles 3 and the magnets 16 spaced from each other but all extending in radial directions and the inner member 4. An outer member 6 of hollow cylindrical configuration is coaxially positioned around the inner member 4 in spaced relation therewith and supports and joins the outer or others of the magnets 16 from the inner ends which are supported and joined by the inner member 4.

The outer member 6 has a plurality of spaced window-like openings 7 formed therethrough at equiangular peripheral distances from each other and of uniform dimensions. The window-like openings 7 extends from each magnet 16 to the next adjacent magnet 16, so that the outer member 6 does not cover any of the poles 3. Each of the poles 3 extends through a corresponding one of the openings 7 to the same radial extent or dimension as the heads 5 of the magnets 16. Each of the permanent magnets 16 has a head 5 which is a South pole. Each head 5 is at the other or outer end of the corresponding magnet 16 from the inner end supported by the inner member 4 and is included with the outer member 6 as a part thereof.

The pole structure, comprising the inner member 4, the outer member 6, the North poles 3 and the permanent magnet South poles 16, 5, is affixed to the rotor shaft of the machine by a suitable arrangement of non-magnetizable supporting members (not shown in the figures). The supporting members affix the pole structure to the rotor shaft either directly or indirectly and the pole structure rotates with the rotor shaft.

The permanent magnets 16 of adjacent magnetic circuits form a parallel magnetic circuit. Due to the decrease in reluctance, this permits a large flow of magnetic lines of force in components utilizing less copper and less electrical energy. The permanent magnets 16 are preferably magnets having a high remanence and a high coercive force so that their characteristic is close to a straight line.

A pair of stationary magnetic yokes 8 and 9 are of annular disc-like configuration and are spaced from each other in axial direction. The yokes 8 and 9 are positioned with the rotor poles 3 and the permanent magnets 16 between them but are spaced from said poles and magnets. Each of the yokes 8 and 9 is of substantially U-shaped configuration, with each positioned on a side of the U and opening toward the other. The yoke 8 is separated from the rim 1 by an air gap 13 and from the outer member 6 by an air gap 12. The yoke 9 is separated from the rim 1 by an air gap 15 and from the outer member 6 by an air gap 14. The yokes 8 and 9 are supported in position by any suitable means (not shown).

A pair of spaced annular excitation coils 10 and 11 are coaxially positioned between the rim 1 and the outer member 6 the excitation coils 10 and 11 function as control coils. The coil 10 is positioned in proximity with the yoke 8 in the area enclosed by the sides and base of its U-shaped cross-section and the coil 11 is positioned in proximity with the yoke 9 in the area enclosed by the sides and base of its U-shaped cross-section. The excitation coils 10 and 11 may conduct excitation currents in opposite directions, in a known manner, so that parallel, symmetrical paths are provided for the flow of magnetic lines of force. This is advantageous from the point of view of the cross-sections of the components of magnetizable material.

The various components of the rotor structure of the present invention may be integrally made of solid material or may be made of laminations. In view of eddy current disturbances, however, the inner member 4 and poles 3 are preferably laminated. This permits the poles 3 and the inner member 4 to be stamped out by machine as individual laminations, with each single lamination in the shape of an annular section having the pole portions radially extending therefrom.

The inner member 4, the rim 1 and the outer member 6 may be eliminated and the poles 3 and the permanent magnets 16 may be supported directly on the rotor shaft, which comprises magnetizable material. Furthermore, the outer member 6 may be replaced by a pair of outer members of annular configuration spaced from each other in axial direction which support and join the outer ends of the permanent magnets 16 between them and which are spaced from the poles 3.

The permanent magnets 16 are responsible for lower weight and lower cost of the synchronous machine of the present invention relative to similar machines which do not utilize such magnets. Furthermore, the rotor structure of the present invention is very simple in structure. The synchronous machine of the present invention produces in a stator coil (not shown in the figures) an AC having a frequency dependent upon the number of North and South poles.

While the invention has been described by means of a specific example and in a specific embodiment, I do not wish to be limited thereto, for obvious modifications will occur to those skilled in the art without departing from the spirit and scope of the invention.

I claim:

1. In a synchronous machine having a rotor shaft having an axis, rotor structure comprising an inner member of substantially hollow cylindrical configuration coaxially positioned around said rotor shaft, a plurality of spaced poles of one polarity uniformly positioned at equiangular distances from each other on said inner member and extending radially equidistantly from said inner member, and a plurality of permanent magnets of the other polarity supported by said inner member in alternate relation with said poles with one of said permanent magnets positioned between each adjacent pair of said poles and extending radially.

2. In a synchronous machine as claimed in claim 1, wherein said poles and said permanent magnets are spaced from each other and said inner member and said poles comprise magnetizable material.

3. In a synchronous machine as claimed in claim 1, an outer member of substantially hollow cylindrical configuration spaced from and coaxially positioned around said inner member and supporting the outer ends of said permanent magnets, said outer member having a plurality of equiangularly extending and equiangularly spaced window-like openings formed therethrough, said outer member being positioned in a manner whereby each of the poles of said inner member extends into a corresponding one of the openings of said outer member.

4. In a synchronous machine as claimed in claim 3, wherein said outer member comprises magnetizable material and each of said permanent magnets and each of said poles extends for the same radial distance.

5. In a synchronous machine as claimed in claim 4, a rim of substantially hollow cylindrical configuration comprising magnetizable material coaxially positioned around said rotor shaft within said inner member.

6. In a synchronous machine as claimed in claim 5, a pair of stationary magnetic yokes of annular disc-like configuration positioned in spaced relation from each other in axial direction with said poles and said permanent magnets between them, each of said magnetic yokes being positioned between and spaced from said rim and said outer member.

7. In a synchronous machine as claimed in claim 6, a pair of spaced annular excitation coils, and wherein each of said magnetic yokes is of substantially U-shaped configuration, with each positioned on its side and opening toward the other, one of said excitation coils being positioned in proximity with one of said yokes in the area enclosed by said one of said yokes and the other of said excitation coils being positioned in proximity with the other of said yokes in the area enclosed by said other of said yokes.

8. In a synchronous machine as claimed in claim 7, wherein each of said inner member and said poles is laminated.

9. In a synchronous machine as claimed in claim 7, a plurality of heads each affixed to the outer end of a corresponding one of said permanent magnets, the outer ends of said poles being cocylindrically positioned with the heads of said permanent magnets.

References Cited

UNITED STATES PATENTS

| 2,796,542 | 6/1957 | Bekey et al. | 310—162 |
| 2,802,959 | 8/1957 | Powers | 310—156 |

FOREIGN PATENTS

| 238,299 | 2/1965 | Austria. |
| 1,238,273 | 7/1960 | France. |

MILTON O. HIRSHFIELD, *Primary Examiner.*

L. L. SMITH, *Assistant Examiner.*